United States Patent [19]

Hyde, Jr.

[11] Patent Number: 5,303,674
[45] Date of Patent: Apr. 19, 1994

[54] HUMMINGBIRD FEEDER
[75] Inventor: Donald B. Hyde, Jr., Stow, Mass.
[73] Assignee: Hyde's Inc., Waltham, Mass.
[21] Appl. No.: 23,691
[22] Filed: Feb. 26, 1993
[51] Int. Cl.$^5$ .................................................. A01K 7/00
[52] U.S. Cl. .................................................... 119/77
[58] Field of Search ............... 119/52.2, 52.3, 52.4, 119/72, 77, 57.8, 57.9; D30/121, 124, 125, 129

[56] References Cited

U.S. PATENT DOCUMENTS

| | | | |
|---|---|---|---|
| 813,954 | 2/1906 | Davis | 119/77 |
| 3,292,589 | 12/1966 | Williams | 119/77 |
| 3,734,061 | 5/1973 | Kraus | 119/52.2 |
| 3,913,527 | 10/1975 | Kilham | 119/27 X |
| 4,691,665 | 9/1987 | Hefner | 119/77 |
| 5,062,390 | 11/1991 | Bescherer et al. | 119/72 |

Primary Examiner—Gene Mancene
Assistant Examiner—Thomas Price
Attorney, Agent, or Firm—Samuels, Gauthier & Stevens

[57] ABSTRACT

A multi-component hummingbird feeder which can be completely disassembled. The hummingbird feeder has a liquid reservoir comprised of a cup-shaped bottom and a dome-shaped top. A hollow neck protrudes vertically from the bottom and through a central aperture in the top. A collar is seated on the top and surrounds the portion of the neck which extends above the top. A head which is adapted to coact with the collar is placed in the upper end of the neck and tightened until the top and bottom elements are in a tight sealing interengagement. Located in the top are feeding ports to provide access to a liquid food supply in the reservoir.

6 Claims, 2 Drawing Sheets

HUMMINGBIRD FEEDER

BACKGROUND OF THE INVENTION

Conventional hummingbird feeders are designed to store and dispense liquids, typically mixtures of sugar and water. Such mixtures are widely used as substitutes for the natural floral nectar consumed by hummingbirds in the wild. It is known, however, that in warm climates, mixtures of sugar and water exhibit a tendency to ferment and provide a media for the growth of bacteria, mold and mildew. The results of the chemical reaction and these growths can endanger the health of the birds being fed.

In order to address this problem, some prior art feeders are subdivided into multiple components which can be disassembled in order to accommodate cleaning of parts contaminated by mold and mildew. The difficulty with these feeders, however, is that they tend to leak along joints between components defining the liquid reservoirs. This can be particularly troublesome when the feeders are exposed to windy conditions tending to swing them about their vertical axes of suspension. The resulting leakage of the liquid sugar mixture onto the underlying ground area and surrounding surfaces attracts bees, which in turn can pose a hazard to humans in the vicinity of the feeders. Other prior art feeders seek to avoid leakage problems by resorting to predominantly unitary designs. In many respects, however, this approach is counterproductive, particularly since it compromises or negates cleaning and proper maintenance.

SUMMARY OF THE PRESENT INVENTION

A general objective of the present invention is to provide a multi-component hummingbird feeder which can be quickly, easily and completely disassembled so that all internal surfaces of the feeder can be thoroughly cleaned.

Another objective of the present invention is to provide a hummingbird feeder which is designed to resist leakage between assembled components, particularly under windy conditions.

These and other objects and advantages of the present invention will become more apparent as the description proceeds with reference to the accompanying drawings.

DETAILED DESCRIPTION OF PREFERRED EMBODIMENT

Figure 1:
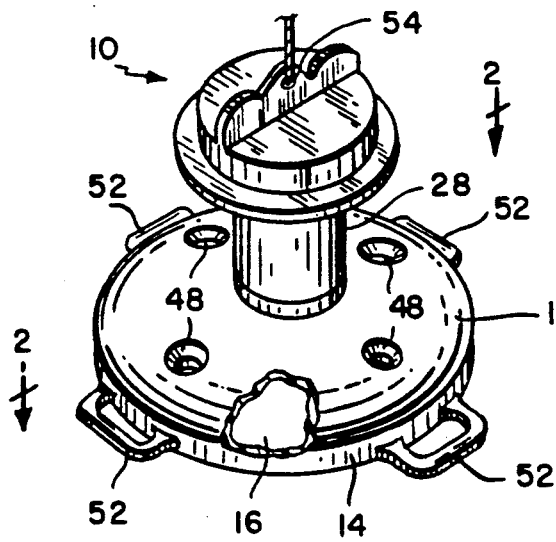
FIG. 1 is a perspective view with a portion broken away of one embodiment of a hummingbird feeder according to the present invention.
Figure 2:
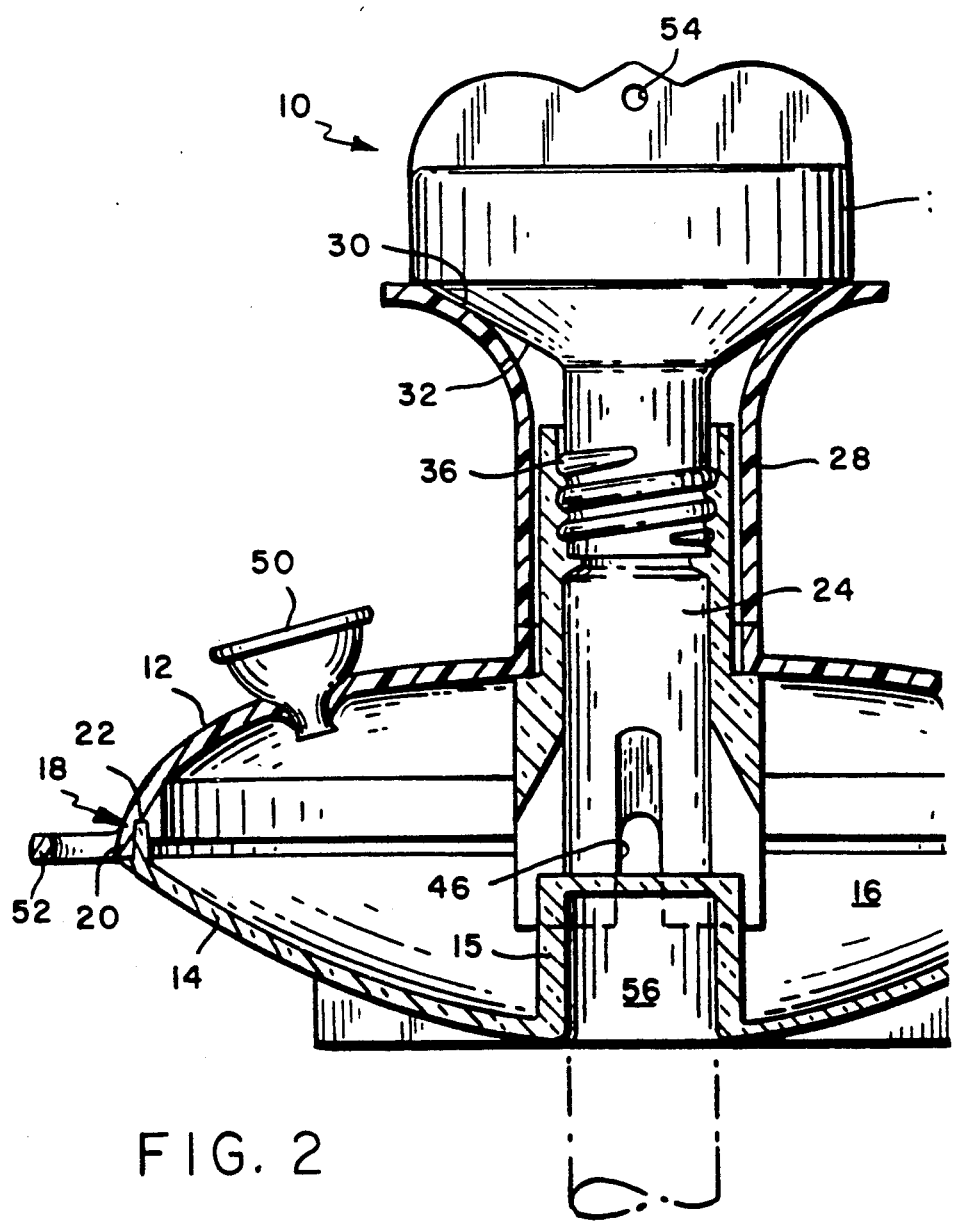
FIG. 2 is a vertical sectional view taken along line 2—2 of FIG. 1.
Figure 3:
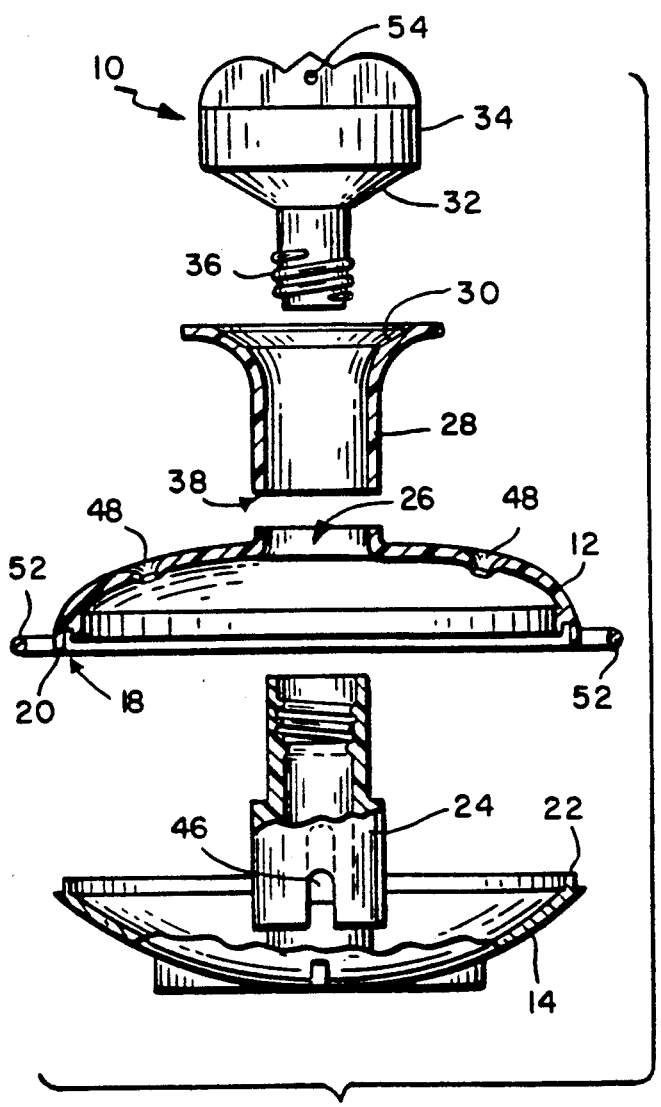
FIG. 3 is an exploded elevational view with portions broken away.

Referring initially to FIG. 1, there is shown a hummingbird feeder 10 having a base formed by a top portion 12 and a bottom portion 14. The top and bottom portions are separably coupled to form a chamber 16 designed to hold a liquid mixture of water and sugar. As illustrated in FIGS. 2 and 3, a circular channel 18 is formed in the bottom edge 20 of the top portion. When the top and bottom portions 12,14 are assembled, the circular upper edge 22 of the bottom portion is received in sealing engagement in the circular channel 18.

Extending upwardly from the floor of the bottom portion 14 is a cap 15 on which is seated a hollow neck 24 which protrudes through a centrally located aperture 26 in the roof of the upper portion 12. A collar 28 surrounds the segment of the neck 24 which extends above the roof of the top portion 12. The collar 28 has an upwardly opening truncated conical mouth 30 contacted by the truncated conical underside 32 of a head 34 having a depending plug 36 threaded into the upper end of the neck 24. As the head 34 is tightened, the truncated conical underside 32 engages the upwardly opening truncated conical mouth 30. The collar 28 is driven downward, such that the bottom edge 38 of the collar contacts the top portion 12 and in turn, urges the top portion into contacting engagement with the bottom portion 14. The head 34 is tightened until the top and bottom portions 12,14 are in a tight sealing interengagement as a result of the upper edge 22 of the bottom portion being fully received in the channel 18 of the top portion.

Figure 4:
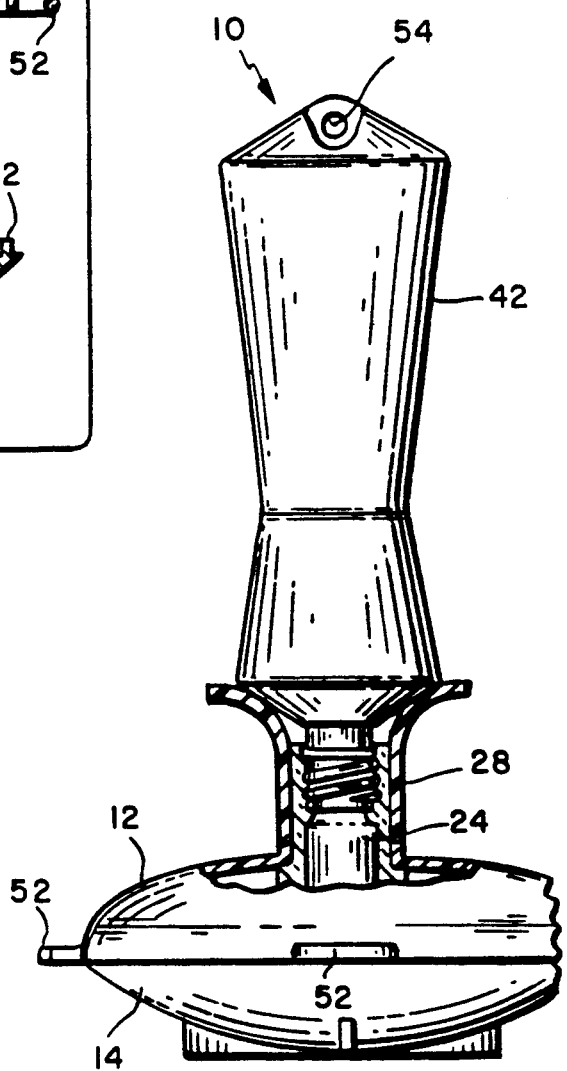
FIG. 4 is a side view of a hummingbird feeder according to an alternative embodiment of the present invention, again with portions broken away.

The head 34 can be primarily a plug to close the neck 24 as illustrated in FIG. 1 or the head can be a liquid container 42 which can retain a supply of food, as illustrated in FIG. 4. The bottom of the neck 24 has small ports 46 communicating with the chamber 16. As the supply of food in the liquid reservoir is depleted, the liquid food in the repository flows through the ports 46 in the neck and into the liquid reservoir to replenish the food supply.

In the top portion 12 are feeding ports 48 providing the birds access to the liquid food supply. "Stand-up" flowers (conical funnels) 50 can be inserted in the feeding ports 48 to help attract birds to the feeder. Opposite the feeding ports 48 and/or the flowers 50 are "resting" perches 52 on which the birds can rest while feeding.

The top of the head 34 has an eye 54 which can be used to suspend the bird feeder. Also the bottom of the feeder has a recess 56 therein to receive a support member such that the feeder can be mounted on a post.

In light of the foregoing, it will now be appreciated by those skilled in the art that changes and modifications to the embodiment herein disclosed can be made without departing from the spirit and scope of the invention as defined by the appended claims. For example, the head and the collar can be integrally formed as a single unit.

What is now claimed is:

1. A hummingbird feeder comprising:
   a cup-shaped bottom cooperating with a dome-shaped top to define a liquid reservoir, said top and bottom having circular rims, one of said rims defining a channel in which the other of said rims is removably received;
   a central aperture in said top;
   a hollow neck formed integrally with and protruding vertically from said bottom through said central aperture and having an upper end extending above said top;
   a collar removably seated on said top at a location surrounding the upper end of said neck;
   a head threadedly engaged with the upper end of said hollow neck, said head being adapted to coact with said collar to urge said bottom and top into sealing interengagement along said circular rims; and feeding ports providing access to liquid contained in said reservoir.

2. The feeder of claim 1 wherein said head defines a second liquid reservoir communicating with said first mentioned reservoir via said hollow neck.

3. The feeder of claim 1 wherein said head further includes means for suspending said feeder from an overlying support.

4. The feeder of claim 1 wherein said collar has an upwardly facing truncated conical mouth engaged by a downwardly facing truncated conical surface on said head.

5. The feeder of claim 1 wherein said bottom is provided externally with means for receiving a support member on which the feeder may be mounted.

6. The feeder of claim 1 wherein said collar and said head are integrally formed as a single unit.

* * * * *